(No Model.)
T. S. PEACOCK.
BREAD OR CAKE PAN.
No. 493,835. Patented Mar. 21, 1893.
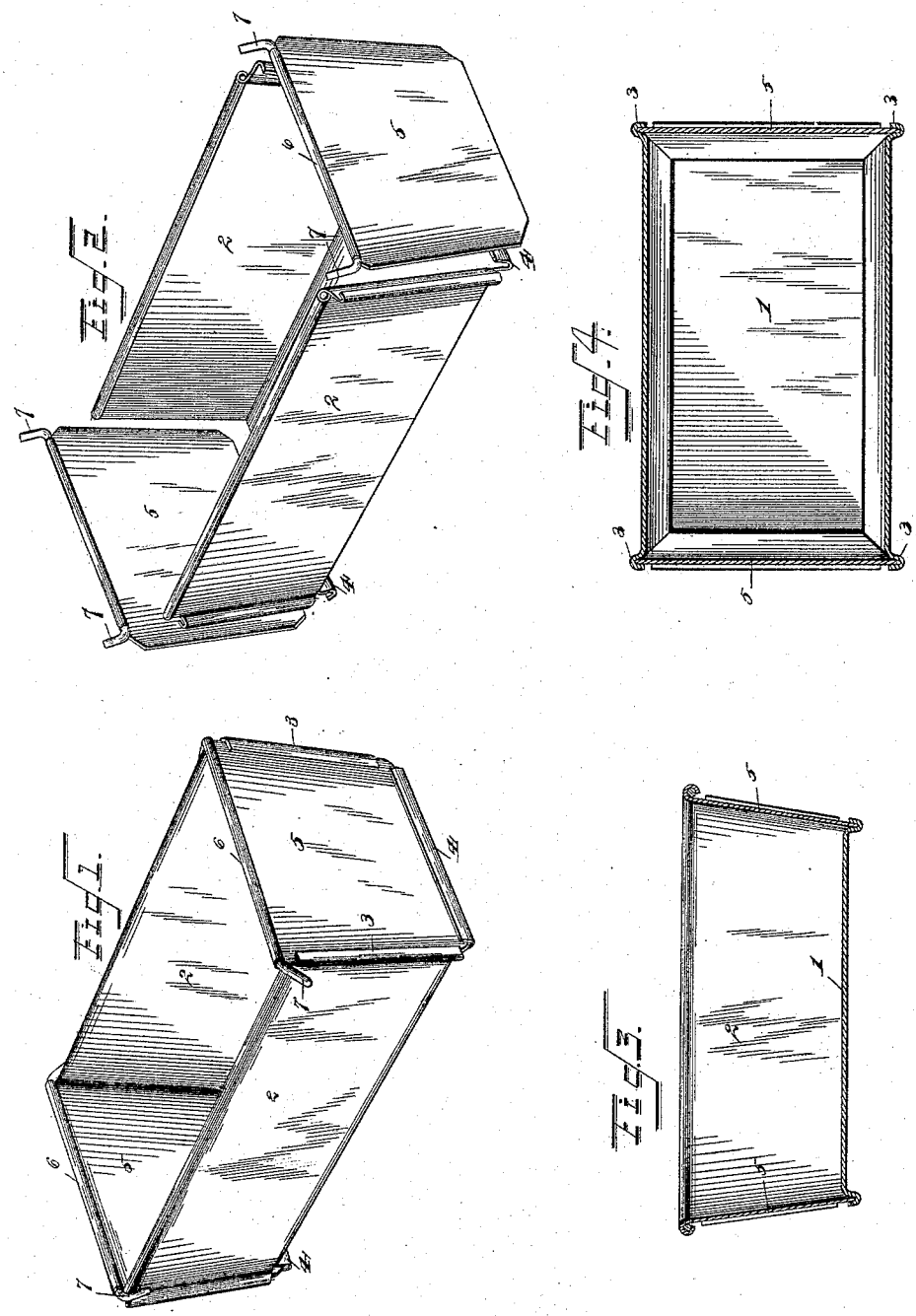

UNITED STATES PATENT OFFICE.

THOMAS S. PEACOCK, OF PAXTON, ILLINOIS.

BREAD OR CAKE PAN.

SPECIFICATION forming part of Letters Patent No. 493,835, dated March 21, 1893.

Application filed September 7, 1892. Serial No. 445,213. (No model.)

*To all whom it may concern:*

Be it known that I, THOMAS S. PEACOCK, a citizen of the United States, residing at Paxton, in the county of Ford and State of Illinois, have invented a new and useful Bread or Cake Pan, of which the following is a specification.

This invention relates to pans for baking bread, cake, puddings, and other articles of cuisine; and the object and advantages thereof, together with the novel features of the same, will be hereinafter more fully described and claimed.

In the drawings:—Figure 1, is a perspective view of the improved pan shown arranged for baking purposes. Fig. 2, is a similar view of the pan showing the parts disconnected to remove the baked contents thereof. Fig. 3, is a longitudinal central vertical section thereof. Fig. 4, is a central horizontal section of the pan.

Similar numerals of reference are employed to indicate corresponding parts in the several figures.

Referring to the drawings, the numeral 1 designates the bottom of the pan having upturned integral sides 2 with upper beaded or wire bound edges for well known purposes. The opposite ends of each of the sides are bent outward at right angles and then bent inward to form guides 3 which are opposingly situated. The opposite ends of the bottom 1 are bent downward and then returned upward to form lower seats 4 in the form of grooves. The said seats form bottom flanges or rests for the pan, to prevent the bottom of the latter from coming in contact with the heating surface and thereby obviating sticking or burning of the material in the pan to the bottom of the latter. The side guides 3 also prevent contact of the sides of the pan directly with a heated surface with the same advantages accruing therefrom. The ends 5 of the pan consist of suitably shaped strips of material similar to that composing the make-up of the pan, and are adapted to be removably fitted in the side guides 3 and the seats 4, and have their upper edges beaded around wires 6 whose opposite ends are extended and bent into the form of catches 7. The wires 6 are rotatably fitted in the upper beaded portions of the ends, and when the catches are turned as shown in Fig. 1, the said ends are held in position against accidental movement. It will be seen that the bent end portions of the bottom and sides forming the guides 3 and the seats 4, are located back of or below a line drawn from the interior surfaces of said sides and bottom, and by this means the ends 5 are caused to form a close joint when arranged in proper position to avoid leakage of the contained material. This arrangement also prevents passage of the contained material into the guides and seats which would produce considerable inconvenience as it would clog the said seats and guides by becoming baked or burned therein. After the material contained within the pan has become sufficiently baked, the catches 7 are released by being turned upward, as shown in Fig. 2, and the ends 5 removed by sliding them vertically by a gradual movement, and thereby leaving the ends of the baked contents free. The sides of the pan are then sprung outward slightly from the baked contents, and the said contents readily removed from either open end, or otherwise as found desirable.

The form of pan herein set forth is simple and effective in its construction and operation, its cost is comparatively reduced to a minimum, and its superior advantages and utility render it exceptionally convenient.

Having thus described the invention, what is claimed as new is—

In a bake-pan, the combination of the sides and bottom struck up from a single piece of metal, said sides and bottom being formed respectively with vertical guides and horizontal transversely-extending seats along the edges of the same, and removable ends fitted in the said guides and seats and provided with locking-arms 7, said guides and seats being located outside of and below the planes of the inner surfaces of said sides and bottom, to cause said ends to form a close joint and prevent leakage of the contained material, substantially as described.

In testimony that I claim the foregoing as my own I have hereto affixed my signature in the presence of two witnesses.

THOMAS S. PEACOCK.

Witnesses:
J. B. SHAW,
F. E. BONNEY.